United States Patent [19]
Sato

[11] Patent Number: 4,843,419
[45] Date of Patent: Jun. 27, 1989

[54] LIGHT QUANTITY MEASURING SYSTEM

[75] Inventor: Makoto Sato, Tokyo, Japan

[73] Assignee: Olympus Optical Co., Ltd., Tokyo, Japan

[21] Appl. No.: 184,029

[22] Filed: Apr. 20, 1988

[30] Foreign Application Priority Data

| Apr. 21, 1987 | [JP] | Japan | 62-98306 |
| Apr. 21, 1987 | [JP] | Japan | 62-98307 |
| Apr. 21, 1987 | [JP] | Japan | 62-98308 |

[51] Int. Cl.$^4$ .............................................. G03B 7/091
[52] U.S. Cl. .................................... 354/426; 354/458
[58] Field of Search ........................ 354/426, 456, 458

[56] References Cited

U.S. PATENT DOCUMENTS

| Re. 29,776 | 9/1978 | Kohtani | 354/23 D |
| 3,677,151 | 7/1972 | Werner et al. | 354/458 |
| 3,703,130 | 11/1972 | Watanabe | 354/458 |
| 3,836,262 | 9/1974 | Yata et al. | 356/226 |
| 3,876,876 | 4/1975 | Kitai et al. | 250/214 P |
| 4,191,459 | 3/1980 | Saito et al. | 354/458 |
| 4,249,109 | 2/1981 | Ogawa | 315/151 |

FOREIGN PATENT DOCUMENTS

| 51-16774 | 5/1976 | Japan . |
| 54-19779 | 7/1979 | Japan . |
| 57-58647 | 12/1982 | Japan . |
| 58-156274 | 9/1983 | Japan . |
| 59-33842 | 8/1984 | Japan . |
| 60-43979 | 3/1985 | Japan . |
| 62-145229 | 6/1987 | Japan . |

Primary Examiner—Russell E. Adams
Attorney, Agent, or Firm—Kenyon & Kenyon

[57] ABSTRACT

A light quantity measuring system with a function of controlling an exposure comprises a capacitor an anode potential of which drops from a predetermined level to a set-up reference level with a rate of change responding to a quantity of light incident on a photodiode through which a discharging current of the capacitor flows. A counter counts a pulse signal with a set-up repetitive frequency, the counted number of which represents a quantity of the light. A counting condition setting means sets the reference level and the repetitive frequency in response to a counted number in the counter so as to prevent an overflow of the counter. A calculating means calculates a quantity of light based on the counted number, the reference level and the repetitive frequency.

12 Claims, 5 Drawing Sheets

| counted number D | | | relative exposure value Ev | count code |
|---|---|---|---|---|
| minimum | median Dm | maximum | $Ev = \log_2(Dm/a)$ | $D'$ |
| 238 | 252 | 255 | $e_1$ | $d_1$ |
| 212 | 224 | 237 | $e_2$ | $d_2$ |
| 189 | 200 | 211 | $e_3$ | $d_3$ |
| 168 | 178 | 188 | $e_4$ | $d_4$ |
| $a-\alpha$ | $a$ | $a+\alpha$ | 0 | $d_m$ |
| 12 | 12 | 13 | $e_{n-1}$ | $d_{n-1}$ |
| 11 | 11 | 11 | $e_n$ | $d_n$ |

FIG. 5

LIGHT QUANTITY MEASURING SYSTEM

BACKGROUND OF THE INVENTION

1. Field of the Invention

This invention relates to a system for measuring a quantity of light reaching the system and also controlling exposure corresponding to a sensed scene to be photographed and more particularly relates to a circuit arrangement for digitized calculation for obtaining a measured quantity of light.

2. Description of the Prior Art

In recent years, systems such as an electronic still camera including a system for measuring a quantity of light for a scene to be photographed over relatively wide range of the measuring have been proposed (see laid-open Japanese patent application, publication No. 60-43979). In such a system, a plurality of amplifiers are provided for changing over the gain according to the level of an output signal produced by a photoelectric conversion device thereby extending the dynamic range for the measurement. One of the amplifiers is selectively connected to the photoelectric conversion device according to the output level of the output signal of the photoelectric conversion device. In the above-mentioned system, much many more amplifiers are needed for obtaining a wide range of the measurement with sufficient resolution, therefore the circuit arranged in the system comes is out very complicated and extravagant aspect.

On the other hand, an exposure control device employing a digitalized technique utilizing a binary counter has been proposed (see published Japanese patent application, publication No. 57-58647). In this device, exposure time is controlled utilizing counting operation in a reversible counter and charging operation of a capacitor. The exposure time is determined by the sum of a time for reverse counting from a preset number in the reversible counter and a time corresponding to a charged-up voltage across the capacitor. Since the device is so arranged that the repetitive frequency for pulses to be counted in the reversible counter is set as relatively low, no large aspect counter is needed for covering wide range of the exposure time. On the contrary, each count number in the reversible counter necessarily represents relatively long time, and a separately provided special capacitor charging operation should be needed for representing a time shorter than the time represented by each count number in the reversible counter so as to obtain a sufficient resolution for determining an exposure time. Such devices employing capacitor charging or discharging operation to represent a time period cannot perform so accurate measurement or control of time, as is generally known.

While a camera capable of taking electronic still pictures employing an auxiliary sensor for measuring the intensity of light and controlling exposure has been proposed (see laid-open Japanese patent application, publication No. 58-156274), the camera has no means for effective compensation for exposure.

SUMMARY OF THE INVENTION

It is, therefore, an object of the present invention to provide a system for measuring a quantity of light reaching the system from a sensed scene by employing a very simplified and compact device covering a sufficiently wide range of measuring.

It is another object of this invention to provide a system for measuring a quantity of light reaching the system from a sensed scene and controlling exposure for the scene to be photographed by employing a wholly digitized computing means in an accurate and reliable manner.

It is another object of this invention to provide a system for controlling exposure capable of compensating exposure in a very simplified manner.

These and other objects of the invention are accomplished by employing a single counting means the counting operation of which is corresponding to a quantity of light reaching the system. Conditions for the counting operation are varied in response to a counting rate thereof in the measuring operation mode set in the system, or the conditions can be selectively set according to a desired exposure compensation in the control operation mode set in the system. A calculating means is employed for calculating a quantity of light by utilizing logarithmic operation based on a counted result of said counting means thereby covering a wide range of measurement. The counting means and the calculating means are both fabricated as wholly digitized devices capable of obtaining accurate and reliable data for the measurement.

BRIEF DESCRIPTION OF THE DRAWINGS

FIG. 5 is a table for explaining a table set in a ROM provided in the system of FIG. 1 so as to carry out logarithmic operation.

DESCRIPTION OF THE PREFERRED EMBODIMENT

Figure 1:
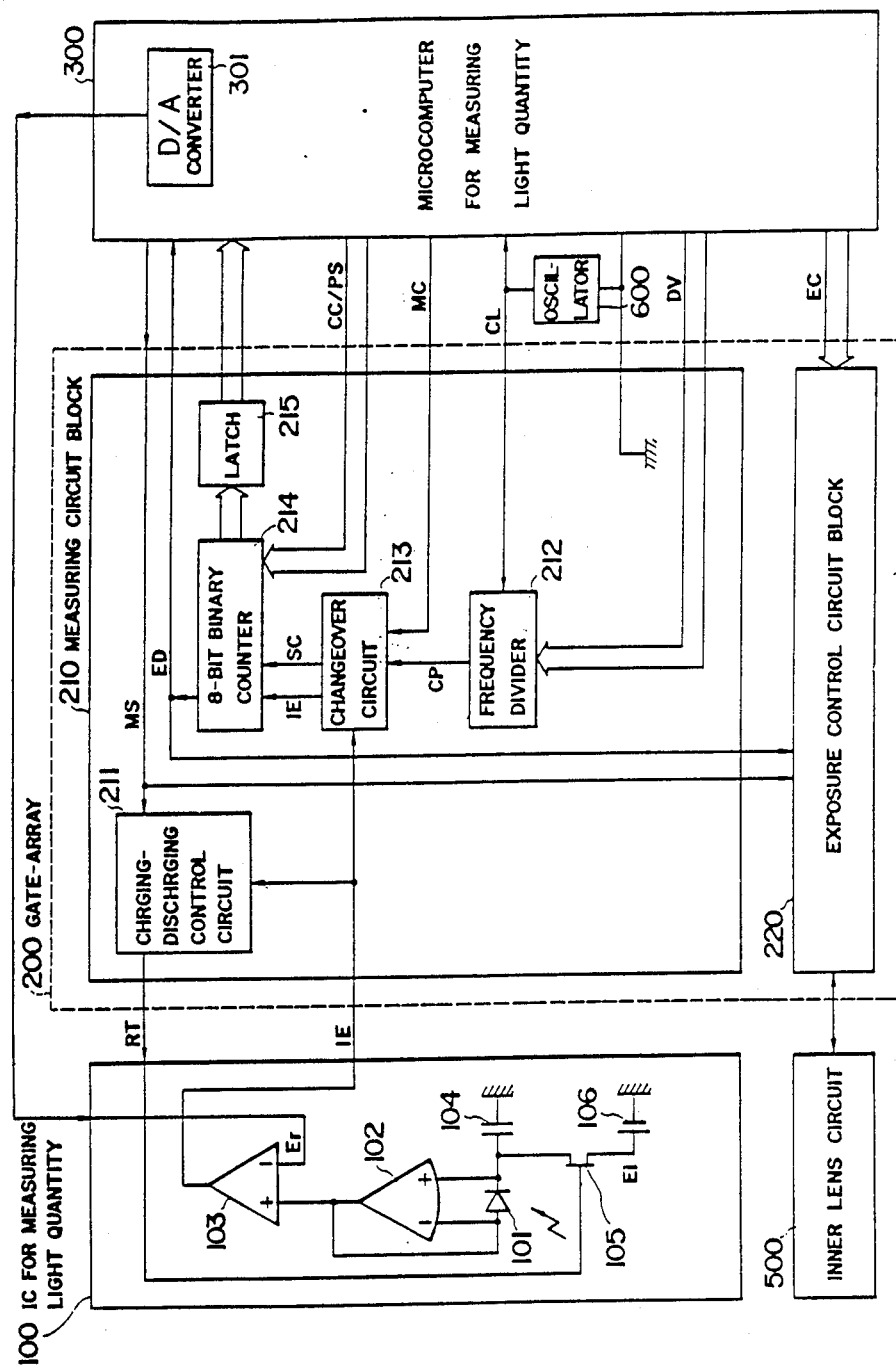
FIG. 1 is a block diagram of a system according to the present invention.
Figure 2:
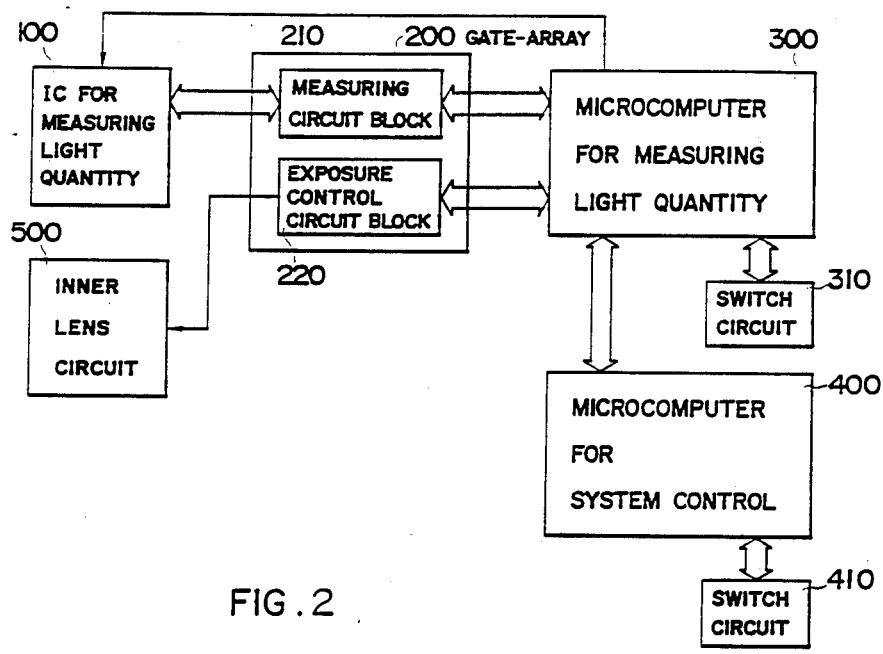
FIG. 2 is a general block diagram of a system including the system of FIG. 1 in part.

FIG. 1 shows a block diagram of an example of a system according to the present invention, and FIG. 2 shows a general block diagram of a system including the system of FIG. 1 in part. The system of FIG. 2 is an electronic still camera employing the system of FIG. 1 for measuring a quantity of light and controlling exposure.

Referring to FIG. 2, an integrated circuit (IC) 100 for measuring light quantity including a photoelectric conversion device, a gate array 200, a microcomputer 300 for measuring light quantity and a microcomputer 400 as a system controller are interconnected with each other through bus or transmitting lines as shown in FIG. 2 so as to transmit and/or receive signals for carrying out prescribed operations. An inner lens circuit 500, built in a lens assembly, for controlling a shutter and setting the f-stop is connected to the gate array 200. The gate array 200 comprises a measuring circuit block 210 for carrying out a signal processing operation based on a signal transferred between the block 210 and the IC 100 or between the block 210 and the microcomputer 300, and further comprises an exposure control circuit block 220 for transferring a control signal between the block 220 and the inner lens circuit 500 based on a signal transferred between the block 220 and the block 210 or between the block 220 and the microcomputer 300. In the system, an iris, a shutter and mechanisms for actuating them are built in the lens assembly. The inner lens circuit 500 comprises a microcomputer. The measuring microcomputer 300 is connected to a switch circuit 310 for allowing a system operator to make various setting operations such as exposure compensation. The system control microcomputer 400 is connected to a switch circuit 410 for selecting an operating mode of the system such as f-stop setting preference mode or shutter setting preference mode and for triggering an exposure.

The operation of the system of FIG. 2 will now be described in a general way.

The description begins with an example wherein the system carries out a pre-measuring operation, in which the system measures a quantity of light reaching the system, taking precedence of (i.e., occuring before or preceding) an exposure control operation. At first, in this IC 100 provides a photoelectric conversion output signal corresponding to a quantity of light reaching the system under the condition that the iris is fully opened. A counter built in the measuring circuit block 210 in the gate array 200 carries out a counting operation responding to the photoelectric conversion output signal, and the light measuring microcomputer 300 computes the quantity of light based on a counted number in the counter. The microcomputer 300 also computes an appropriate shutter speed and/or f-stop setting. These computed data are transferred to the system control microcomputer 400. Based on the data transferred from the light measuring microcomputer 300, the system control microcomputer 400 provides an indication control signal for carrying out an indicating operation for the shutter speed, f-number setting, etc., corresponding to the measured quantity of light. In this system, as will be described hereinafter more particularly, the light measuring microcomputer 300 always monitors a counted number in the counter and sets a counting operation repetitively, varying the counting conditions, if necessary, so as to prevent overflow in the counter. Therefore, a very wide dynamic range of measurement under the condition that the iris is fully opened (namely, the so-called "Exposure Setting at Maximum Aperture") can be dealt with by a relatively small scale counter.

Then, the exposure control operation will be described. When a trigger switch in the switch circuit 410 is turned on, the system control microcomputer 400 issues to the light measuring microcomputer 300 a command signal for changing the system operation from the pre-measuring operation to the exposure control operation. In the embodiment of the present invention, a sole IC for measuring light quantity is employed for both pre-measuring and exposure control. Exposure control is carried out while maintaining a continuous real time light measuring (integrating a quantity of light) over the period of exposure. When the light measuring operation starts, the light quantity integrating operation and issuance of a signal for starting integration of photoelectric charge in an image sensor are commenced as an operation of the IC 100. Whenever the integrated level of the photoelectric conversion output signal in the light measuring IC 100 (more concretely, a voltage across a capacitor corresponding to a time-integrated photoelectric conversion current) reaches a predetermined level set up by the light measuring microcomputer 300 for the light measuring IC 100, the IC 100 issues successive integration terminate pulses to the measuring circuit block 210 in the gate array 200. The measuring circuit block 210 counts up the pulses received from the IC 100 in integrating manner and resets the IC 100 immediately after reception of each pulse. When the counted number in the light measuring block 210 reaches a predetermined number (i.e., preset number) which has been set by the system control microcomputer 400 through the light measuring microcomputer 300, the measuring circuit block 210 issues a control signal to the inner lens circuit 500 through the exposure control circuit block 220. The inner lens circuit 500 carries out an exposure time terminating operation, that is, closes the shutter and/or terminates photoelectric signal integrating operation of the image sensor. In the above-mentioned system, a reference signal level for the integrating operation to be set in the light measuring IC 100 from the light measuring microcomputer 300, and the preset number to be set in the measuring circuit block 210 of the gate array 200 can be selectively varied so as to take an appropriate magnitude corresponding to an exposure compensation value or other factors required.

Now, more concrete arrangement and operation of the system of this invention will be described.

FIG. 1 shows a block diagram of a system forming an important part of the system of FIG. 2. In FIG. 1, parts corresponding to those of the system of FIG. 2 are designated by using the same numbers. In the light measuring IC 100, a photodiode 101 is connected between the input terminals of an operational amplifier 102, an output terminal of the operational amplifier 102 is connected to one of the input terminals of a comparator 103, and a reference level signal Er is supplied to the other input terminal of the comparator 103. A capacitor 104 for charge integrating operation is connected between the ground and the cathode of the photodiode 101. A connection node between the capacitor 104 and the cathode of the photodiode 101 is connected through the drain and source of a FET 105 for switching operation to the anode of a reference voltage producing means (cell) 106 which produces a standard level voltage Ei, and the cathode of the cell 106 is grounded. Particularly in the present invention, the IC for measuring light quantity has no logarithmic device for logarithmically compressing a wide range of signal to a relatively narrow dynamic range, though the logarithmic compressing device such as an diode is generally utilized for measuring light quantity. As mentioned above with respect to FIG. 2, the gate array 200 comprises the measuring circuit block 210 and the exposure control circuit block 220. The measuring circuit block 210 comprises a charging-discharging control circuit 211 for supplying a pulse-shaped reset signal RT to the gate of the FET 105; a frequency divider 212 which receives a clock signal CL from an oscillator 600 for generating a clock signal also commonly utilized for the light measuring microcomputer 300 and issues a clock signal with its frequency divided at a ratio corresponding to a divide command signal DV from the light measuring microcomputer 300; a changeover circuit 213 which responds to a changeover control signal MC from the microcomputer 300 for selectively changing over the operation mode between the light measuring operation mode and the exposure control operation mode and selectively changes over an input thereto: pulse signal CP (SC) for counting operation issued from the frequency divider 212 and/or an integration terminate pulse signal IE of the comparator 103 in the IC 100; an a 8-bit binary counter 214 for counting an output pulse signal from the changeover circuit 213; and a latch 215 for latching a counted result of the 8-bit binary counter 214 and supplying it to the microcomputer 300. The 8-bit binary counter 214 is also capable of receiving the integration terminate pulse signal IE through the changeover circuit 213 and supplying that signal to both the exposure control circuit block 220 and the microcomputer 300 as a measuring terminate signal ED. The measuring terminate signal ED is also issued when a preset number in the 8-bit counter 214 is successively reverse counted and reaches down to zero. A measurement commence signal MS from the microcomputer 300 may be supplied to the charging-discharging control circuit 211 and the exposure control circuit block 220. A D/A converter 301 built in the microcomputer 300 issues a reference level signal Er to be supplied to the comparator 103 in the light measuring IC 100.

Operation of the system above-mentioned will be particularly described below.

While the measuring operation mode is selected in the system, an iris (stop) built in a lens assembly (not shown) is maintained in its maximum aperture under control of the inner lens circuit 500, responding to a command signal from the microcomputer 300. The microcomputer 300 issues the measurement commence signal MS to the charging-discharging control circuit 211, then the charging-discharging control circuit 211 supplies the reset signal RT to the gate of FET 105. The FET 105 turns on during a relatively short period in which the reset signal RT takes its high-level state with a relatively small duty factor, therefore the capacitor 104 is charged up to the standard voltage Ei by the charging current supplied to the capacitor 104 from the cell 106. The FET 105 as a switch turns off immediately after the reset signal RT turns to its low level state, and the integrated charge of the capacitor 104 is discharged along the photodiode 101 responding to a quantity of light incident thereto. The anode potential of the capacitor 104 is reduced from its charged-up potential Ei with its rate of change corresponding to discharge current. The output voltage level of the operational amplifier 102 goes down following the changing of the voltage of the capacitor 104. When the output voltage level of the operational amplifier 102 reaches the level of the reference signal Er, the comparator 103 issues an output signal as the integration terminate pulse signal IE.

Figure 3:
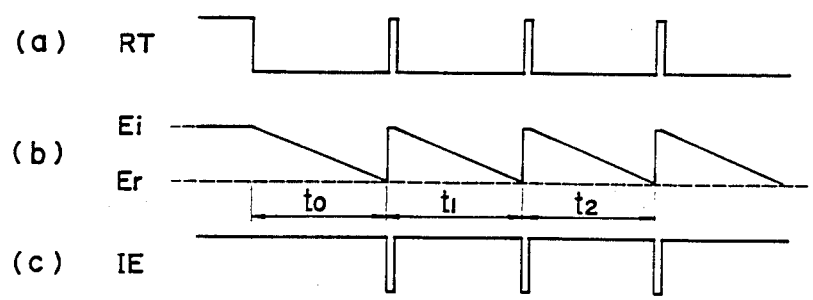
FIG. 3 is a graphical representation of selected signal levels occurring in time, of the system of FIG. 1.

FIG. 3 is a graphical representation of selected signal levels occurring in time, of the system of FIG. 1. FIG. 3(a) represents the reset signal RT supplied to the gate of the FET from the charging-discharging control circuit 211. FIG. 3(b) represents an anode voltage level of the capacitor 104. FIG. 3(c) represents the integration terminate pulse signal IE issued from the comparator 103. As shown in FIG. 3, a charging-discharging operation of the capacitor 104 is repeated in synchronism with the reset signal RT, while the reset signal RT is successively produced at the same interval as that of the integration terminate pulse signal IE. As mentioned above, the change of the anode voltage level of the capacitor 104 shown in FIG. 3(b) is due to discharge current along the photodiode 101. The rate of change of the voltage level of the capacitor 104 is proportional to an intensity of light received by the photodiode 101. A time-integrated volume of the discharge current along the photodiode 101 is equal to a quantity of electric charge discharged from the capacitor 104.

That is, $$\int_o^t i_{sc}\, dt = C\,(Ei - Er) \quad (1)$$

where C=the capacitance of the capacitor 104, Ei=the standard voltage of the cell 106, Er=the reference signal level set in the comparator 103, t=a time period in which the voltage across the capacitor 104 is reduced from Ei to Er, and $i_{sc}$=a discharge current of the capacitor 104 along the photodiode 101.

Therefore, $$i_{sc} = \frac{C}{t}\,(Ei - Er) \quad (2)$$

The discharge current $i_{sc}$ represented by the equation (2) corresponds to a quantity of light incident on the photodiode 101. Since the capacitance C takes a constant value, the quantity of light can be computed by measuring the time period t. Naturally, the time period t corresponding to each discharging operation varies with the quantity of light. Even if the light intensity is maintained at a constant level, the time period t also varies with the reference signal level set in the comparator 103. In this system, a time period t is measured by counting the number of pulses on the pulse train CP having a set-up repetitive frequency supplied from the frequency divider 212 through the changeover circuit 213, and the counted result represents a time period t. The 8-bit binary counter 214 is employed for the counting. As previously stated, the repetitive frequency of the pulse signal CP is determined according to a dividing ratio for the clock signal CL supplied from the oscillator 600, which ratio is set up by the divide command signal DV from the microcomputer 300.

The 8-bit binary counter 214 is capable of selectively counting the pulse CP (SC) e integration terminate pulse signal IE according to the changeover state of the changeover circuit 213. When the light quantity measurement mode (pre-measurement operation) is set in this system according to a command from the system control microcomputer 400 (FIG. 2), the 8-bit binary counter counts successive pulses on the pulse train signal CP supplied from the changeover circuit 213, a changeover state of which is selected according to the changeover control signal MC from the microcomputer 300.

Figure 4:
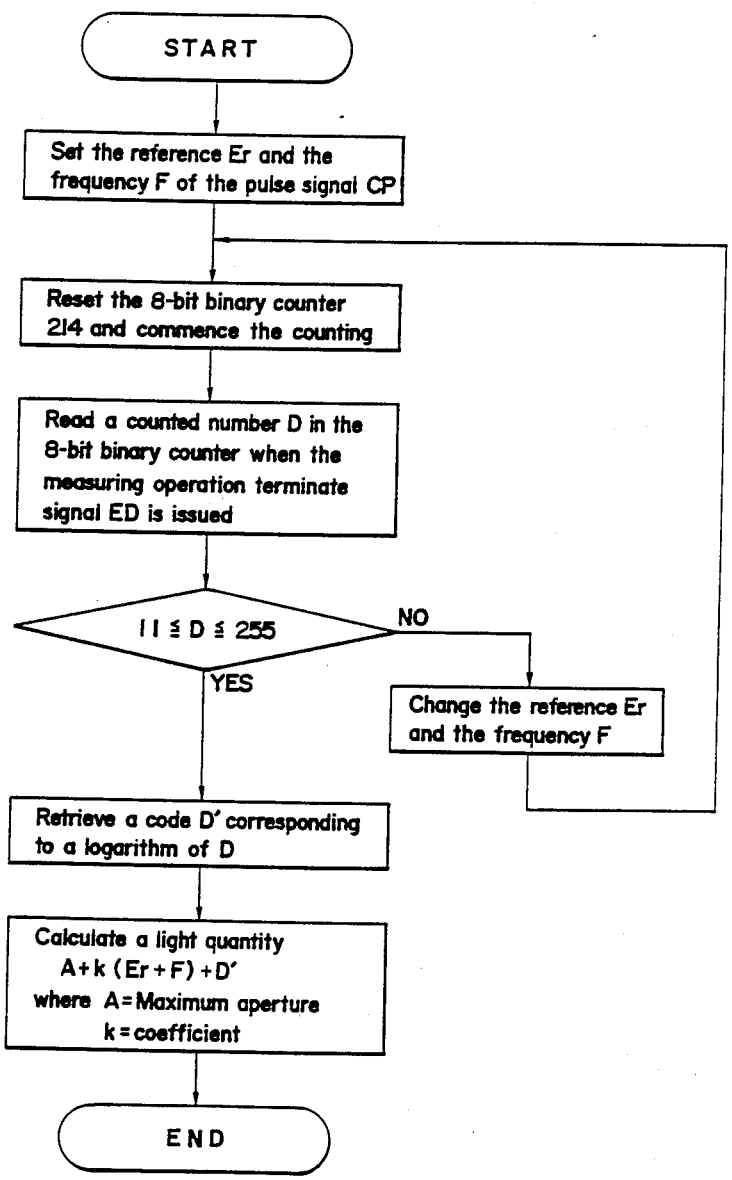
FIG. 4 is a flow chart for explaining operation of the system of FIG. 1.

FIG. 4 is a flow chart for explaining operation of the system of FIG. 1. Now, the system is explained with utilizing the flow chart of FIG. 4.

When the light quantity measuring operation (premeasurement operation) of the system is started, the microcomputer 300 supplies the reference level signal Er to the comparator 103 along the D/A converter 301 provided therein. Further, the microcomputer 300 primarily sets up a repetitive frequency F as an output signal frequency of the frequency divider 212 by supplying the divide command signal DV to the frequency divider 212. The charging-discharging control circuit 211 resets the capacitor 104 (that is, charges up to the standard voltage Ei) by supplying the reset signal RT to the FET switch 105 responding to the measurement commence signal MS from the microcomputer 300. In the same instant, the microcomputer 300 resets the 8-bit binary counter 214 by supplying a counter clear command signal CC to the counter 214. Immediately after the reset operation of the 8-bit binary counter 214, the voltage across the capacitor 104 commences to drop at a rate of change responding to a quantity of light incident on the photodiode 101. Over the time period when the voltage across the capacitor 104 maintains its reductive changing, the 8-bit binary counter 214 counts successive pulses on a pulse train signal SC primarily supplied from the frequency divider 212 as the pulse train CP through the changeover circuit 213. The output signal level of the operational amplifier 102 drops following to the reduction of the voltage across the capacitor 104 and reaches the level of the reference signal Er, then the integration terminate pulse signal IE is issued from the comparator 103. Receiving the integration terminate pulse signal IE, the charging-discharging control circuit 211 issues the reset signal RT again. A charging-discharging operation of the capacitor 104 is carried out again and again in the above-mentioned manner. The integration terminate pulse signal IE is also supplied to the microcomputer 300 as a measuring operation terminate signal ED through the changeover circuit 213 and the 8-bit binary counter 214 (a signal transfer circuit provided separately from a counter circuit block in the counter 214). The microcomputer 300 reads a counted number D of the 8-bit binary counter 214 through the latch 215 in response to the measuring operation terminate signal ED. when the a quantity of light incident on the photodiode 101 takes a relatively high level (i.e., is relatively high) a voltage across the capacitor 104 (through the operational amplifier 102) drops at a relatively high rate of change, and the capacitor voltage reaches the level of the reference signal Er in a short period. On the contrary, a period in which the capacitor voltage reaches the level of the reference signal Er is extended under the condition that the quantity of incident light takes a relatively low level (i.e., is relatively low). Therefore, it is apprehended that the 8-bit binary counter 214 overflows in case the quantity of incident light takes relatively low level. Particularly, in this system, the light measurement operation is carried out at the maximum aperture for the stop, so that a very wide dynamic range of measurement is needed, for instance, over 100 dB. In the conventional systems 20-bit or more large aspect counter has been needed for obtaining a measuring resolution in a degree of ±10%. In the system of the present invention, however, the microcomputer 300 monitors a counted number D in the counter all the time and changes the level of the reference signal Er and/or the repetitive frequency F of the pulse signal CP to be counted, so as to limit a counted number within a predetermined number. Thus, the system of the present invention is capable of covering a very wide dynamic range for measurement as mentioned above (that is, 20-bit or more large counter is needed in the conventional case) by employing only the 8-bit counter alone, with a sufficient resolution and accuracy maintained. The microcomputer 300 determines whether the counted number D in the 8-bit binary counter 214 is within the range of 11 to 255 (in the decimal), and changes the level of the reference signal Er and/or the repetitive frequency F of the pulse train CP to be counted, if the counted number D is out of the range. If the counted number D is maintained out of the range in spite of once changing the level of the reference signal Er and/or the repetitive frequency F of the pulse signal CP to be counted, the microcomputer 300 changes them again until the counted number D is brought within the mentioned range. In this system, the successive counting operation of the 8-bit binary counter corresponding to the charging-discharging operation of the capacitor 104 is repeated at a rate of about ten times per second. When the microcomputer 300 determines that a counted number D is within the mentioned range, it calculates a quantity of incident light based on the data for a counted number D, a level of the reference signal Er and a repetitive frequency F of the pulse signal CP to be counted. Notably, in this system, in case a time period corresponding to the charging-discharging operation of the capacitor 104, which period represents a light intensity and in which period the pulse counting operation of the 8-bit binary counter 214 is continued, is relatively short, the repetitive frequency F of the pulse signal CP (i.e., SC) is set at a relatively high rate. Namely, a relatively short period is measured by utilizing relatively fine pulses. Because the error affects the measurement as the ratio of the error to the true value, a high resolution and accuracy can be obtained in the system of the invention.

Further, in this system, a very efficient calculation is employed for calculating a quantity of light, as will be mentioned below.

A ROM is built in the microcomputer 300, and a coding table is set in the ROM. In the coding table, each successive counted number D (a range of D) is in comparison with a corresponding count code D'. The count code D' is a logarithm of a relative value of a counted number D to the base 2, wherein the relative value of a counted number is defined as D/a (a=an integer). The microcomputer 300 directly codes a counted number D by utilizing the coding table. Therefore, no individual mathematical operations for coding individual counted numbers D are employed in the microcomputer 300.

FIG. 5 shows a content of the coding table provided in the ROM. As shown in FIG. 5, every successive count code D' corresponds to a value within a range of counted number D. Each count code D' ($d_1, d_2, d_3, \ldots, d_m, \ldots, d_{n-1}, d_n$) successively corresponds to a relative exposure value Ev ($e_1, e_2, e_3, \ldots, 0, \ldots, e_{n-1}, e_n$) The relative exposure value Ev is defined as:

$$Ev = \log_2 (Dm/a)$$

where
Dm=median of the counted number D within a mentioned range, and
a=a basis number of the counted number D.
The calculation for measuring light quantity and exposure is quantity simplified by employing the logarithmic method as mentioned above, utilizing the APEX (Additive system of Photographic Exposure). Although the relative exposure values Ev individually take a value including a decimal fraction, each value Ev corresponds to a count code D' as an integer, so that the calculation is more simplified. In the table of FIG. 5, the counted number D (median Dm)=a is selected as the basis for the relative exposure value Ev, then the relative exposure value Ev corresponding to Dm=a is zero, and a count code dm is (assigned) to the Ev=0.

In case the counted number D takes a value from 238 to 255 both inclusive (median Dm=252), the relative exposure value $Ev = \log_2 (252/a) = e_1$ ($e_1$ may include a decimal fraction), and the corresponding count code is $d_1$ ($d_1$ is an integer). The microcomputer 300 calculates a quantity of light by utilizing the count code D' based on the coding table as shown in FIG. 5. The calculating operation is as follows:

$$A + k(E_r + F) + D' \qquad (3)$$

where $A$ = the maximum aperture (f-stop),
$k$ = a predetermined coefficient,
$E_r$ = reference signal level for the comparator 103,
$F$ = repetitive frequency of the pulse signal CP, and
each value is represented by a code.

The microcomputer 300 calculates an incident light quantity by carrying out an operation along the mentioned expression (3) and transfers to the system control microcomputer 400 data for indication in order to display an appropriate shutter speed and/or f-stop corresponding to a f-stop setting (in the f-stop setting preference mode) or a shutter speed setting (in the shutter speed setting preference mode) being set from the outside of the system at that time. Receiving the data, the microcomputer 400 carries out an operation for the indication. On the other hand, the microcomputer 300 transfers an exposure control command signal EC to the exposure control circuit block 220 so as to make the inner lens circuit 500 control the shutter or the stop in the lens assembly in an appropriate manner, in case the f-stop setting preference mode or the shutter speed setting preference mode is set in this system. When a program operation mode is set in the system, the microcomputer 300 computes an appropriate f-stop setting and shutter speed corresponding to an incident light quantity at that time, based on a program set in the ROM, and issues the exposure control command signal EC to activate the inner lens circuit 500. A suitable data parallel to serial converter means and a data serial to parallel converter means (not shown) is provided for signal exchanging between the exposure control circuit block 220 and the inner lens circuit 500, so that a sufficient number of data or command signals can be transferred through one or more conductors.

Figure 6:
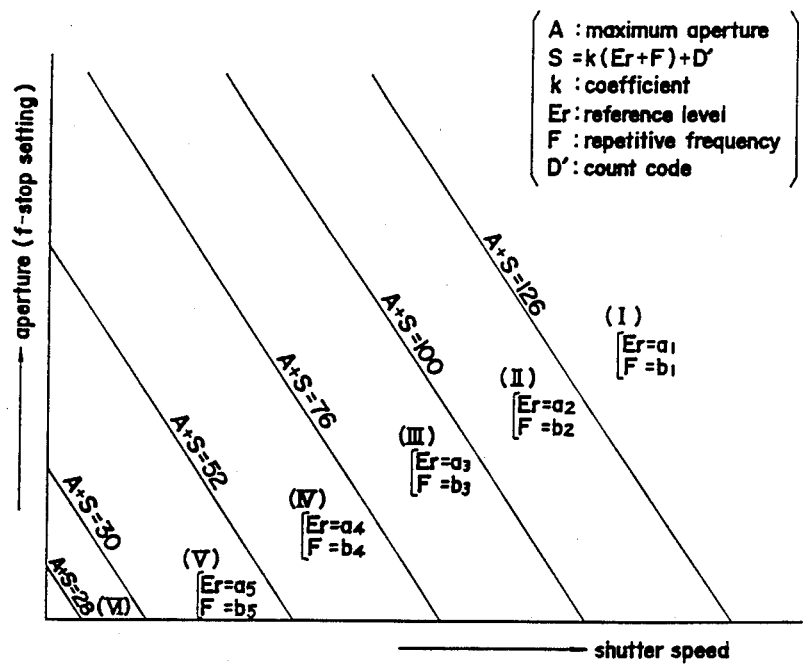
FIG. 6 is a diagram for explaining the operation of the system of FIG. 1.

FIG. 6 is a diagram showing shared areas of value (f-stop setting and shutter speed) corresponding to the reference level $E_r$ for the comparator 103 and the repetitive frequency $F$ of the pulse signal CP, both being selectively set in this system responding to an incident light quantity. For example, in the area (I) corresponding to the most high quantity of incident light, the reference level $E_r$ for the comparator 103 is set at $a_1$ and the repetitive frequency $F$ of the pulse signal CP is set at $b_1$. Similarly, in the area (III) corresponding to the third level of quantity of incident light, the $E_r$ is set at $a_3$ and the $F$ is set at $b_3$. In this embodiment, $a_3$ may be set equal to $a_1$, but $b_3$ should be set lower than $b_1$.

Now, an operation of the system in the exposure control mode will be set forth. As stated above, in this system, the exposure control operation is carried out maintaining a continuous real time light measuring (integrating an incident light quantity) during the period of the exposure.

Sensing a depressing action of the trigger switch, the system control microcomputer 400 sets the operation mode of this system to the exposure control mode, and the light measuring microcomputer 300 switches the changeover circuit 213 by issuing the changeover control signal MC for selectively changing over the operation mode between the light measuring operation mode and the exposure control operation mode. Then, the integration terminate pulse signal IE to be counted is supplied to the 8-bit binary counter 214. Further, the microcomputer 300 supplies a preset data signal PS to the 8-bit binary counter 214 and presets the counter 214. The preset data signal PS represents a required exposure corresponding to a normal exposure control operation or several steps of exposure compensation operation. The microcomputer 300 also sets up a level of the reference signal $E_r$ for the comparator 103. When the exposure starts, the anode potential of the capacitor 104 commences to drop from the standard voltage $E_i$ which has been previously set by the cell 106, with a rate of change responding to a quantity of light incident on the photodiode 101 which receives the light under substantially the same exposure condition for the image sensor (not shown). Then, the output level of the operational amplifier 102 reaches the level of the reference signal $E_r$, the comparator issues the integration terminate pulse signal IE, similarly in the pre-measurement operation as mentioned above. In the exposure control mode, contrary to the pre-measurement mode, the integration terminate pulse signal IE is supplied to the 8-bit binary counter 214 for reverse counting. On the other hand, the charging-discharging operation of the capacitor 104 is repeated, similarly in (i.e. is identical to that) the pre-measurement mode. Upon receiving each integration terminate pulse IE, the contents of the 8-bit counter 214 are successively reduced from the preset number (PS). When the contents of the 8-bit counter 214 zero, the counter 214 issues the measuring operation terminate signal ED. Receiving the signal ED, the exposure control circuit block 220 issues the exposure terminating command signal to the inner lens circuit 500. The inner lens circuit 500 operates for terminating the exposure, such as closing the shutter, in response to the exposure terminating command from the exposure control circuit block 220. Therefore, in this system, an appropriate normal exposure control operation can be performed by setting a state that m times of the repetitive discharging operation of the capacitor 104, namely m times of the repetitive issues of the integration terminate pulse signal, corresponds to an exposure time (period) for a normal exposure, and by setting the m to the 8-bit binary counter 214 as a preset number PS. A n-steps of over exposure compensation can be obtained by setting $2m, 2^2m, \ldots, 2^{2n}m$ as a preset number PS to the 8-bit binary counter 214. On the other hand, a n-steps of under exposure compensation can be obtained by setting $m/2, m/2^2, \ldots, m/2^{2n}$ to the counter 214.

A time period for one cycle of a discharging operation of the capacitor 104 can be varied responding to a level of the reference signal $E_r$ set up to the comparator 103. Namely, a time period for one cycle of a discharging operation of the capacitor 104, that is, a time period between successive counts of the 8-bit binary counter 214, is shortened by setting a voltage difference of $E_i$ to $E_r$ to be relatively narrow. Therefore, in this system, a resolution of the exposure compensation can be advanced more fine by setting more narrow voltage difference of $E_i$ to $E_r$.

As can be comprehended from the explanation above, the photodiode 101 is utilized in this system for both light measuring and controlling exposure. Further, a sufficiently wide dynamic range of measurement can be covered by employing a relatively small bits counter and varying the counting condition such as the frequency of pulse signal to be counted. Moreover, a single 8-bit binary counter can operate as a time counter (in the pre-measuring mode) and also a setting means for setting the steps of exposure compensation. The function of the 8-bit binary counter is changed responding to the mode selection operation of the light measuring microcomputer 300 receiving a command from the system control microcomputer 400 which is sensing a state of the trigger switch (not shown).

In this system, a focal plane shutter may be applied in place of the lens shutter. Further, a driving circuit built in the camera body and capable of driving the image sensor itself as a shutter may be applied in place of the mechanical shutter.

What is claimed is:

1. A system for measuring a quantity of light reaching the system from a sensed scene by employing digitized calculation, said system comprising:

photoelectric conversion means for providing a signal, the rate of change of the level of said signal varying in response to the quantity of light received by a light sensitive device arranged therein;

counting means for providing a counted result corresponding to said rate of change of said signal level under preset counting conditions;

counting condition adjusting means for setting said preset counting conditions depending on said counted result of said counting means while monitoring the count operation of said counting means; and calculating means for calculating the quantity of light received based on said counted result and preset counting conditions at that time.

2. A system in accordance with claim 1, wherein said photoelectric conversion means comprising:

a photodiode as a light sensitive device for converting incident light into a corresponding electric current;

a capacitor connected in series to said photodiode, the voltage across said capacitor substantially developing an integrated value of discharge current along said photodiode; and charging means for charging up said capacitor within a relatively short period at a reset timing.

3. A system in accordance with claim 1, wherein said counting means comprising:

comparator means for comparing said signal level of said photoelectric conversion means with a preset reference signal level and deriving an integration terminating pulse signal when said signal level of said photoelectric conversion means reaches said preset reference signal level;

pulse signal generating means for generating a pulse signal having a preset repetitive frequency; and counter means for counting the number of pulses supplied from said pulse signal generating means within a time period from just after receiving a reset timing pulse signal until receiving said integration terminating pulse signal.

4. A system in accordance with claim 1, wherein said c counting condition setting means presets at least one of a reference signal for comparator means and a repetitive frequency for pulse signal generating means, both said comparator means and said pulse signal generating means being included in said counting means.

5. A system for measuring a quantity of light reaching the system from a sensed scene and for controlling exposure for the scene to be photographed, said system comprising:

operation mode selecting means for selecting the system operation between a measuring operation mode and a control operation mode;

a single photoelectric conversion means for providing a signal, the rate of change of the level of said signal varying in response to the quantity of light received by a light sensitive device arranged therein, said signal being periodically reset in accordance with a preset condition;

a single counting means for counting, in accordance with preset counting conditions, the number of pulses supplied from pulse generating means included in said counting means for generating a pulse a signal having a predetermined repetitive frequency, within a time period determined in accordance with the rate of change of said signal provided by said photoelectric conversion means when said operation mode selecting means selects the measuring operation mode, and for counting said signal supplied from said photoelectric conversion means when said operation mode selecting means selects the control operation mode;

counting condition setting means for adjusting the preset counting conditions depending on the counted result of the counting means while monitoring the count operation of the counter;

calculating means for calculating the quantity of light by employing logarithmic calculation based on a counted result of said counting means when said measuring operation mode is selected; and control means for controlling exposure time of said system based on the comparison between a counter number of said counting means and a preset number for said counting means when said control operation mode is selected.

6. A system in accordance with claim 5, wherein said single photoelectric conversion means comprising:

a photodiode as a light sensitive device for converting incident light into a corresponding electric current;

a capacitor connected in series to said photodiode, the voltage across said capacitor substantially developing an integrated value of discharge current along said photodiode; and charging means for charging up said capacitor within a relatively short period at a reset time.

7. A system in accordance with claim 5, wherein the counting means includes a comparator and the signal provided by said single photoelectric conversion means is received by the comparator means in an unaltered state.

8. A system in accordance with claim 5, wherein said single counting means comprising:

comparator means for comparing said signal level of said photoelectric conversion means with a preset reference signal level and deriving an integration terminating pulse signal when said signal level of said photoelectric conversion means reaches said preset reference signal level; and counter means for counting the number of pulses supplied from said pulse signal generating means within a time period beginning just after receipt of a reset timing pulse signal and ending on receipt of said integration terminating pulse signal when said control operation mode is selected.

9. A system in accordance with claim 5, wherein said counting means comprises counting condition setting means for presetting at least one of a reference signal for comparator means and/or a repetitive frequency for said pulse signal generating means, said comparator means being included in said counting means.

10. A system in accordance with claim 5, wherein said control means comprising:

presetting means for presetting a number relating to a desired exposure when said control operation mode is selected; and counting operation changing means for changing additive counting operation of said counting means to subtractive counting operation when said control operation mode is selected.

11. A system for controlling exposure for a scene to be photographed by employing digitized technique, said system comprising:

photoelectric conversion means for providing a signal, the rate of change of the level of said signal varying in response to the quantity of light, said signal being periodically reset at a successive timing when said signal level reaches a predetermined level;

counting means for counting a repetitive changing of said signal supplied from said photoelectric conversion means in accordance with preset counting conditions;

counting condition setting means for adjusting the preset counting condition of said counting means depending on the counted result of the counting means while monitoring the count operation of the counting means; and control means for controlling an exposure for the system by terminating the exposure at a point of time when the counted number in said counting means reaches a predetermined value.

12. A system in accordance with claim 11, wherein said photoelectric conversion means comprising:

a photodiode as a light sensitive device for converting incident light into a corresponding electric current;

a capacitor connected in series to said photodiode, the voltage across said capacitor substantially developing an integrated value of discharge current along said photodiode; and charging means for charging up said capacitor to a predetermined level.

* * * * *

UNITED STATES PATENT AND TRADEMARK OFFICE
CERTIFICATE OF CORRECTION

PATENT NO. : 4,843,419
DATED : 27 JUNE 1989
INVENTOR(S) : Makoto SATO

Page 1 of 3

It is certified that error appears in the above-identified patent and that said Letters Patent is hereby corrected as shown below:

| Column | Line | |
|---|---|---|
| 1 | 27 | Delete "much". |
| 1 | 30 | Delete "comes" and "out". |
| 1 | 31 | Delete "aspect. |
| 2 | 12 | Delete "is corresponding" and insert --corresponds-- |
| 3 | 19 | After "in this" insert --system, the--. |
| 4 | 46 | Change "an diode" to --a diode--. |
| 6 | 50 | Delete "with". |
| 7 | 10 | Delete "to". |
| 7 | 26 | Change "when" to --When--; delete "a". |
| 7 | 42 | After "systems" insert --a--. |
| 8 | 49 | Change "quantity" to --greatly--. |
| 8 | 59 | Before "(assigned)" insert --given--. |
| 9 | 12 | Change "a" to --an--. |
| 10 | 23 | Before "zero" insert --reach--. |
| 10 | 54 | Delete "more fine" and insert --with greater precision--; after "setting" insert --a--. |

UNITED STATES PATENT AND TRADEMARK OFFICE
CERTIFICATE OF CORRECTION

PATENT NO. : 4,843,419
DATED : 27 JUNE 1989
INVENTOR(S) : Makoto SATO

It is certified that error appears in the above-identified patent and that said Letters Patent is hereby corrected as shown below:

| Column | Line | |
|---|---|---|
| 11 | 19 | Change "adjusting" to --setting--; change "setting" to --adjusting--. |
| 11 | 28 | Change "comprising" to --comprises--. |
| 11 | 39 | Change "comprising" to --comprises--. |
| 11 | 54 | Before "counting" delete "c". |
| 12 | 8 | Before "signal" delete "a". |
| 12 | 26 | Change "counter" to --counted--. |
| 12 | 31 | Change "comprising" to --comprises--. |
| 12 | 48 | Change "comprising" to --comprises--. |
| 12 | 64 | Change "and/or" to --and--. |
| 12 | 68 | Change "comprising" to --comprises--. |

UNITED STATES PATENT AND TRADEMARK OFFICE
CERTIFICATE OF CORRECTION

PATENT NO. : 4,843,419

DATED : June 27, 1989

INVENTOR(S) : Makoto Sato

It is certified that error appears in the above-identified patent and that said Letters Patent is hereby corrected as shown below:

| Column | Line | |
| --- | --- | --- |
| 14 | 11 | Change "comprising" to --comprises--. |

Signed and Sealed this

Fifth Day of June, 1990

Attest:

HARRY F. MANBECK, JR.

Attesting Officer     Commissioner of Patents and Trademarks